(12) United States Patent
Hoopes

(10) Patent No.: US 10,406,456 B1
(45) Date of Patent: Sep. 10, 2019

(54) MODULAR DISTRIBUTION AND COLLECTION ASSEMBLIES, FILTER ASSEMBLIES, AND RELATED METHODS

(71) Applicant: Intuitech, Inc., Salt Lake City, UT (US)

(72) Inventor: Eric J. Hoopes, Holladay, UT (US)

(73) Assignee: Intuitech, Inc., Salt Lake City, UT (US)

( * ) Notice: Subject to any disclaimer, the term of this patent is extended or adjusted under 35 U.S.C. 154(b) by 257 days.

(21) Appl. No.: 15/359,494

(22) Filed: Nov. 22, 2016

(51) Int. Cl.
| | |
|---|---|
| *B01D 24/12* | (2006.01) |
| *B01D 24/46* | (2006.01) |
| *B01D 24/42* | (2006.01) |
| *B01D 24/00* | (2006.01) |

(52) U.S. Cl.
CPC ....... *B01D 24/4636* (2013.01); *B01D 24/001* (2013.01); *B01D 24/12* (2013.01); *B01D 24/42* (2013.01); *B01D 2101/02* (2013.01); *B01D 2101/04* (2013.01)

(58) Field of Classification Search
CPC ........ B01D 24/12; B01D 24/14; B01D 24/16; B01D 24/165; B01D 24/167; B01D 24/42; B01D 24/4636; B01D 2101/02; B01D 2101/04; B01D 2201/084; B01D 24/001
See application file for complete search history.

(56) References Cited

U.S. PATENT DOCUMENTS

| | | | |
|---|---|---|---|
| 1,615,071 A * | 1/1927 | Cobb | B01D 24/12 210/293 |
| 2,412,032 A | 12/1946 | Bill, Jr. | |
| 3,840,117 A | 10/1974 | Ross | |
| 4,076,625 A * | 2/1978 | Scholten | B01D 24/008 210/274 |
| 4,707,257 A | 11/1987 | Davis et al. | |
| 5,618,426 A | 4/1997 | Eischen et al. | |
| 5,720,537 A * | 2/1998 | Lutz | A47B 87/0246 312/111 |
| 5,865,999 A | 2/1999 | Shea et al. | |
| 6,325,931 B1 | 12/2001 | Roberts et al. | |
| 7,288,193 B2 | 10/2007 | Roberts et al. | |
| 8,069,630 B2 | 12/2011 | Slack et al. | |
| 2004/0226492 A1* | 11/2004 | Carter | A47B 87/02 108/158.12 |

* cited by examiner

*Primary Examiner* — Matthew O Savage
(74) *Attorney, Agent, or Firm* — TraskBritt

(57) ABSTRACT

A modular distribution assembly comprises a top plate and a bottom plate, each of the top plate and the bottom plate comprises a plurality of recesses. A plurality of support members are slidably coupled to each of the top plate and the bottom plate, each support member of the plurality of support members comprising a protrusion on each of opposing sides thereof, each protrusion slidably coupled to a corresponding recess of the top plate and a corresponding recess of the bottom plate. Related assemblies comprising the modular distribution assembly and related methods of forming the modular distribution assembly and the assembly are disclosed.

17 Claims, 17 Drawing Sheets

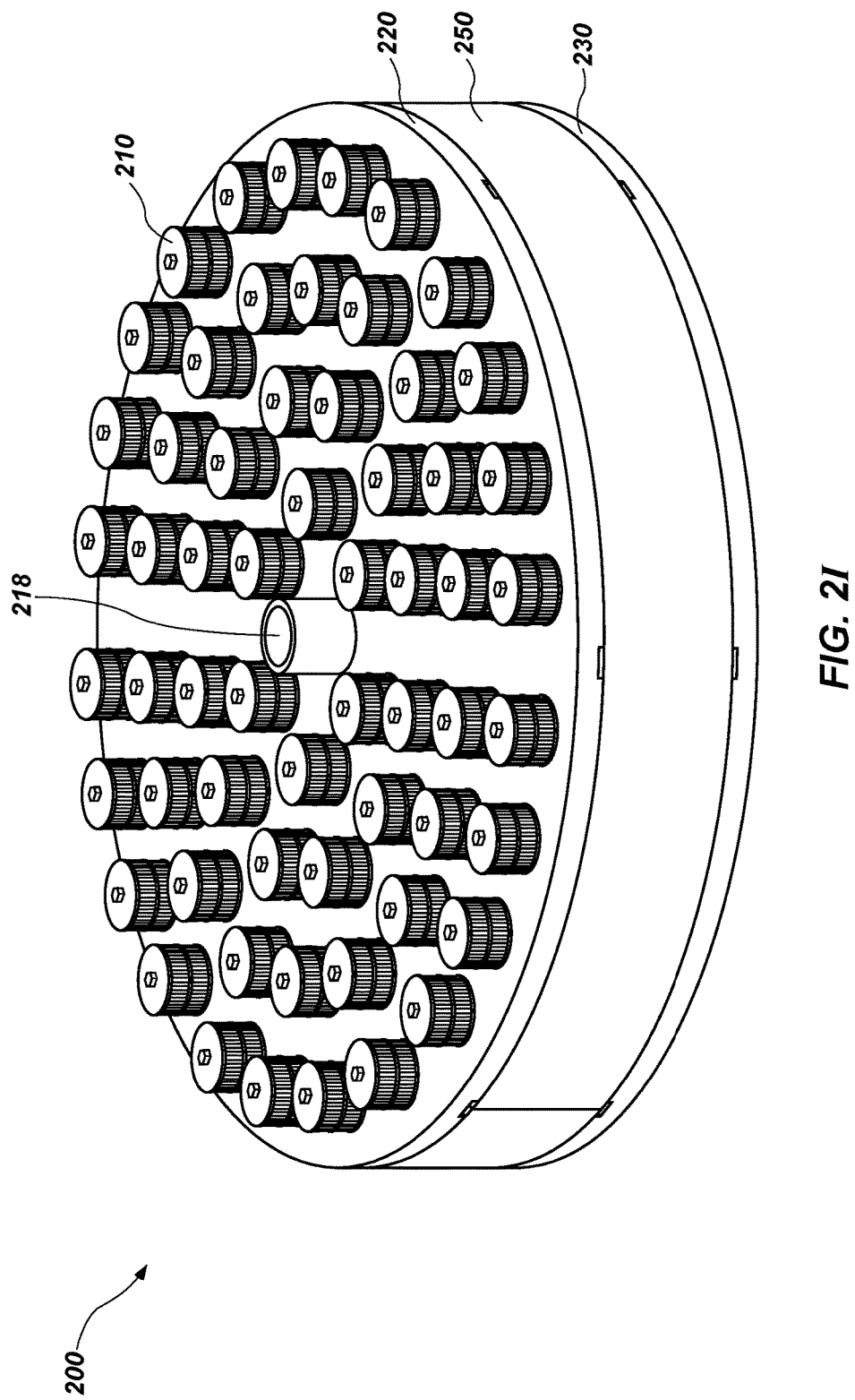

MODULAR DISTRIBUTION AND COLLECTION ASSEMBLIES, FILTER ASSEMBLIES, AND RELATED METHODS

FIELD

Embodiments of the disclosure relate generally to assemblies including modular distribution assemblies, and related methods. More particularly, embodiments of the disclosure relate to assemblies including modular distribution assemblies having at least one support member that may be slidably coupled to one or more of a top plate and a bottom plate, and related methods.

BACKGROUND

Filters are useful for water treatment and purification. Water and wastewater filters typically include sand, gravel, anthracite, activated carbon (e.g., granular activated carbon (GAC)), or other filter media. For example, granular media filters typically comprise particulate filter beds comprising sand, anthracite, etc. The filter bed is typically supported by a floor in the filter assembly configured to divide the filter assembly into an inlet side and an outlet side.

During use and operation of the filter assembly, a fluid stream may pass through the filter media. As the fluid passes through the filter media, suspended solids and other particulate matter may be removed and retained by the filter media, purifying the fluid stream. Purified fluids (i.e., filtrate) passing through the filter assembly may be collected by an assembly (e.g., a collection assembly) which may include, for example, a manifold including laterals and a header conduit (which may also be referred to as an "underdrain assembly"). In some embodiments, the collection assembly may include a perforated false bottom to support the filter media bed and to provide a system of fluid passageways for collecting the filtered fluid from the bottom of the filter assembly.

After a predetermined volume of fluid has passed through the filter media or a predetermined amount of solids have been retained by the filter media, the filter media may be considered "saturated" (i.e., "loaded") with the suspended solids. The filter media may be regenerated to remove the suspended solids from the filter media by a process referred to in the art as "backwashing." Backwashing includes passing a backwashing fluid (e.g., water, air, or both) upward through the collection assembly to the filter bed to remove the suspended solids from the filter and form a backwash fluid highly concentrated with the suspended solids. Because the collection assembly may also operate to distribute a fluid to the filter bed, the collection assembly may also be referred to herein as a distribution assembly. The distribution assembly may operate to substantially uniformly distribute the backwashing fluid (e.g., liquid or gas) through the filter bed.

Fabrication of distribution and collection assemblies for a filter system or other system typically requires welding the distribution assembly to the system. Components of the distribution assembly may be threadably attached to each other, welded to each other, or both to form the distribution assembly. However, threaded attachments and welded connections are difficult to form and often suffer from weak connections that are unable to withstand significant pressure drops to which the distribution assembly may be exposed.

BRIEF SUMMARY

Embodiments disclosed herein include assemblies including modular distribution assemblies, related modular distribution assemblies, and related methods. For example, in accordance with one embodiment, a modular distribution assembly comprises a top plate and a bottom plate, each of the top plate and the bottom plate comprising a plurality of recesses and a plurality of support members slidably coupled to each of the top plate and the bottom plate, each support member of the plurality of support members comprising a protrusion on each of opposing sides thereof, each protrusion slidably coupled to a corresponding recess of the top plate and a corresponding recess of the bottom plate.

In additional embodiments, an assembly comprises a tank housing a modular distribution assembly. The modular distribution assembly comprises a top plate and a bottom plate, each of the top plate and the bottom plate comprising a plurality of recesses and a plurality of support members slidably coupled to each of the top plate and the bottom plate, each support member of the plurality of support members comprising a protrusion on each of opposing sides thereof, each protrusion slidably coupled to a recess of the top plate and a recess of the bottom plate.

In further embodiments, a method of forming an assembly comprises forming a modular distribution assembly by slidably attaching a plurality of support members to a bottom plate and to a top plate, disposing an outer ring around the bottom plate and the top plate, the outer ring extending from the bottom plate to the top plate, and welding the outer ring to the top plate and to the bottom plate.

BRIEF DESCRIPTION OF THE SEVERAL VIEWS OF THE DRAWINGS

FIG. 2I is a perspective view of the modular distribution assembly of FIG. 1, in accordance with embodiments of the disclosure;

DETAILED DESCRIPTION

Figure 1:
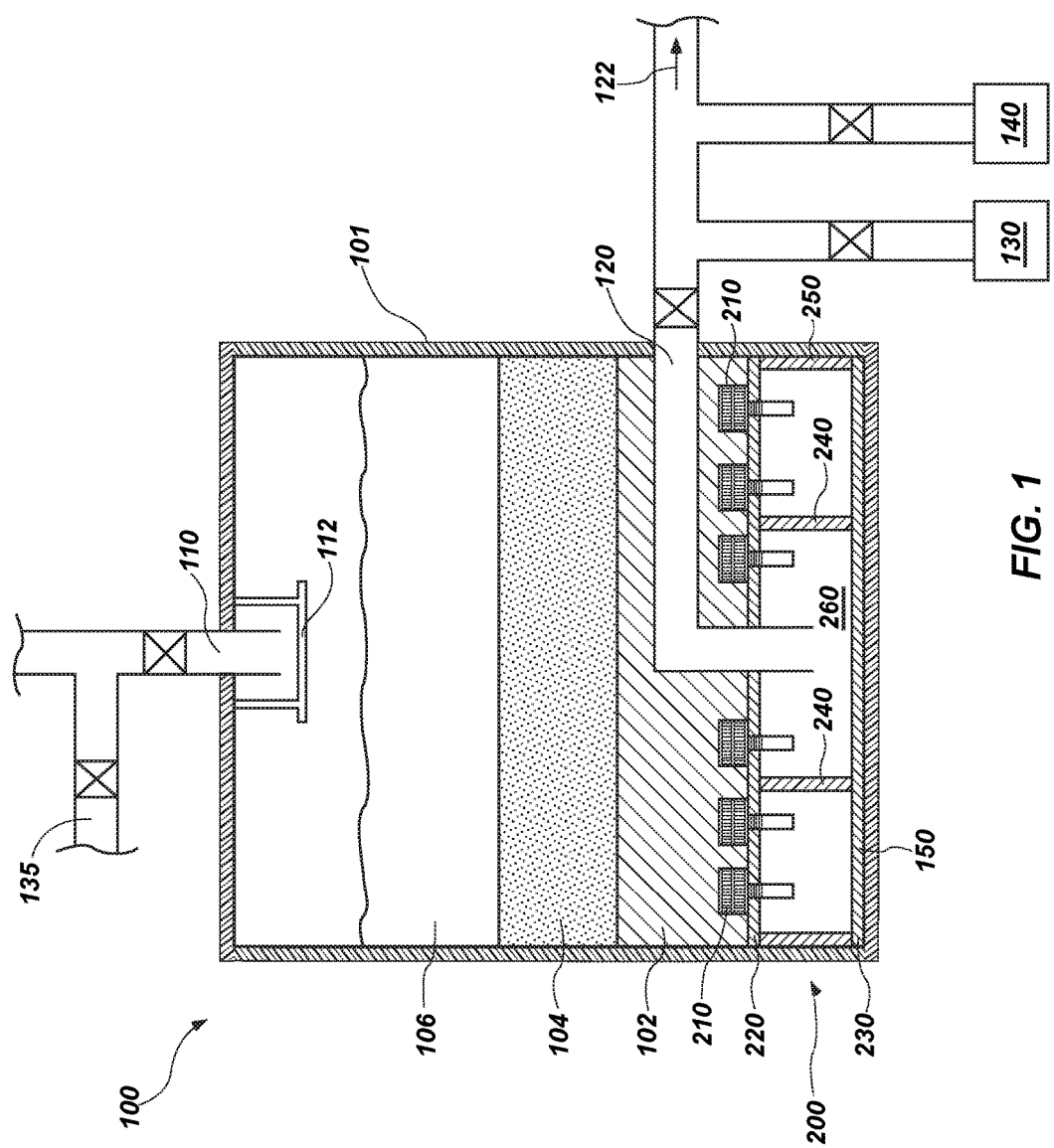
FIG. 1 is a simplified schematic illustrating a filter assembly including a modular distribution assembly, in accordance with embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a modular distribution assembly or a system including the modular distribution assembly. Only those process acts and structures necessary to understand the embodiments of the disclosure are described in detail below. For example, additional structures (e.g., piping, valves, flow meters, pressure regulators, etc.) often used to form a modular distribution assembly or a system including the modular distribution assembly may be configured to perform their respective techniques as would be understood by one of ordinary skill in the art. Also of note, any drawings accompanying the present application are for illustrative purposes only, and are thus not drawn to scale. Additionally, elements common between figures may retain the same numerical designation.

According to embodiments described herein, a system (e.g., a filter assembly) includes a modular distribution assembly (e.g., a modular underdrain assembly) configured to be removably installed into (e.g., dropped in) the system. The modular distribution assembly comprises a top plate, a bottom plate, and at least one support member between the top plate and the bottom plate. The at least one support member may be configured to slidably engage and couple with one or more of the top plate or the bottom plate. In some embodiments, one or both of the top plate and the bottom plate comprises one or more recesses configured to receive a corresponding one or more protrusions of the support member. By way of nonlimiting example, a recess of the top plate, the bottom plate, or both may slidably receive a respective protrusion of the support member to couple the support member to the top plate, the bottom plate, or both. In some embodiments, the combination of the recess and the protrusion comprises a sliding dovetail joint. In other embodiments, the recess and protrusion form a T-slot joint. In other words, the support members may be coupled to the top plate and the bottom plate with a sliding dovetail joint, a T-slot joint, or other slidable joint.

Because the support member is slidably coupled to each of the top plate and the bottom plate, the modular distribution assembly may be assembled and installed without welding the support structures to the top plate or the bottom plate, which may be particularly advantageous in relatively small assemblies in which it is difficult for a technician to weld (e.g., assemblies having a distance between the top plate and the bottom plate less than about 122 cm (about 48 inches), such as less than about 15 cm (about 6 inches)). In addition, the support members may be coupled to the top plate and the bottom plate without threaded fasteners. In some embodiments, the modular distribution assembly may be configured to withstand excessive differential pressures, such as up to about 310 kPa (about 45 psi). In addition, the slidable configuration may facilitate easy removal and installation of the modular distribution assembly in a system including the modular distribution assembly (e.g., a filter assembly, a dewatering assembly, a fluidized bed reactor, etc.).

FIG. 1 is a simplified cross-sectional view of an assembly 100 including a modular distribution assembly 200, in accordance with embodiments of the disclosure. The assembly 100 may be configured to purify fluids passing therethrough to form a filtrate, as known in the art of fluid filtration. By way of nonlimiting example, the assembly 100 may be configured to purify water (e.g., wastewater) or other fluid, such as by removing solids dissolved or suspended in the water. In some embodiments, the assembly 100 comprises a filter tank 101.

The assembly 100 may be cylindrical in shape, although the disclosure is not so limited and the assembly 100 may comprise other suitable shapes for housing the modular distribution assembly 200. By way of nonlimiting example, the assembly 100 may comprise an oval, arcuate, square, rectangular, hexagonal, or other cross-sectional shape. In some embodiments, the assembly 100 comprises a circular cross-sectional shape. In some such embodiments, the assembly 100 may have a diameter from about 5.08 cm (about 2 inches) to about 4.88 meters (about 16 feet), such as from about 5.08 cm to about 50 cm (about 19.7 inches), from about 50 cm (about 19.7 inches) to about 100 cm (about 39.4 inches), from about 100 cm (about 39.4 inches) to about 200 cm (about 78.7 inches), from about 200 cm (about 78.7 inches) to about 300 cm (about 118.1 inches), from about 300 cm (about 118.1 inches) to about 400 cm (about 157.5 inches), or from about 400 cm (about 157.5 inches) to about 500 cm (about 196.9 inches). In some embodiments, the assembly 100 has a diameter of about 122 cm (about 48 inches). Of course, other dimensions are contemplated.

In some embodiments, the assembly 100 may include a gravel bed 102 overlying the modular distribution assembly 200. The modular distribution assembly 200 may comprise what is referred to in the art as a "false bottom" configured to support and retain a media bed 104. The media bed 104 may overlie the gravel bed 102. The media bed 104 may comprise sand, anthracite, activated carbon (e.g., granular activated carbon (GAC)), or other filter media formulated and configured to remove contaminants or solids from a fluid, or combinations thereof. In some embodiments, the media bed 104 comprises activated charcoal. The activated charcoal may be functionalized and formulated to remove particular contaminants from the fluid stream, as known in the art of fluid purification. In other embodiments, the media bed 104 may comprise an ion exchange resin material, such as ion exchange resin beads (having a diameter of about 100 µm, for example) configured to exchange ions of magnesium or calcium with ions of sodium. In some such embodiments, the assembly 100 may be referred to as a resin bed or a water softener. In yet other embodiments, the media bed 104 may comprise plastic media, polypropylene media, polyethylene media, other media, or combinations thereof. A fluid 106 to be filtered or purified may overlie the media bed 104.

In use and operation, the fluid 106 may enter the assembly 100 through a fluid inlet 110 and exit the assembly 100 through a fluid outlet 120. The fluid inlet 110 may include a fluid distributor 112 configured to uniformly distribute the fluid 106 to the media bed 104. In some embodiments, the fluid distributor 112 comprises a baffle plate, an impingement plate, or other structure configured to redirect the incoming fluid. In other embodiments, the fluid distributor 112 comprises a header lateral configured to evenly distribute the incoming fluid 106 evenly across a cross-section of the media bed 104. The fluid 106 passes through the media bed 104 where the media in the media bed 104 retains particulate matter suspended in the fluid 106 and filters the fluid 106 or removes contaminants (e.g., dissolved salts) therefrom to purify the fluid 106. After passing through the media bed 104, the fluid 106 may be substantially pure, having substantially all of the solids or dissolved contaminants removed therefrom. In some embodiments, fluid from the media bed 104 may pass through the gravel bed 102 and to the modular distribution assembly 200, such as through a plurality of nozzles 210. The nozzles 210 may be coupled to a top plate 220 of the modular distribution assembly 200. The nozzles 210 may be configured to direct filtered fluid that has passed through the media bed 104 to the modular distribution assembly 200. From the modular distribution assembly 200, the fluid 106 may exit the assembly 100 through the fluid outlet 120 and to another unit, a storage tank, etc., as indicated at arrow 122.

After a period of time, the media bed 104 may become saturated (i.e., loaded) with materials that have been filtered from the fluid 106, reducing a filtration or purification efficiency of the assembly 100. Accordingly, the assembly 100 may be configured to be backwashed with a blackwash fluid to regenerate the media bed 104. In some embodiments, a backwash fluid source 130 may be coupled to the fluid outlet 120 of the assembly 100. The backwash fluid source 130 may be configured to provide a backwash fluid to regenerate the media bed 104 by removing solids or ions retained by the media in the media bed 104. The backwash fluid may flow through the fluid outlet 120 and to the nozzles 210 of the modular distribution assembly 200. The nozzles 210 may be configured to evenly distribute the backwash fluid to the media bed 104 and substantially prevent channeling of the backwash fluid through the media bed 104. The backwash fluid may exit the assembly 100 through a backwash fluid exit line 135.

A gas source 140 may be coupled to the fluid outlet 120 to provide a scouring gas to the assembly 100. In some embodiments, a scouring gas (e.g., air or other suitable pressurized gas) may be introduced into the assembly 100 through the fluid outlet 120 to the nozzles 210 and to the media bed 104. The nozzles 210 may be positioned and configured to substantially evenly distribute the scouring gas through the media bed 104. The scouring gas may agitate the media bed 104 and dislodge any material adhered thereto. In some such embodiments, the backwash fluid may carry away the particulate matter dislodged by the scouring gas from the assembly 100. In other embodiments, the backwash fluid comprises brine or other solution formulated and configured to regenerate the media bed 104.

Although the assembly 100 has been described as comprising a downflow filter assembly, the disclosure is not so limited. In some embodiments, the assembly 100 comprises an up-flow assembly, such as an up-flow filtration assembly. In other embodiments, the assembly 100 comprises a fluidized bed reactor. In some such embodiments, the media bed 104 may comprise a catalytic media (e.g., such as where the assembly 100 comprises a circulating fluid bed) or other fluidized bed media. In yet other embodiments, the assembly 100 may comprise a dewatering vessel. In some such embodiments, the assembly 100 may not include the media bed 104 or the gravel bed 102 and the top plate 220 may be configured to prevent passage of a sludge material while allowing water to pass therethrough. In additional embodiments, the assembly 100 may not include the media bed 104 or the gravel bed 102 and may comprise a vessel for retaining a fluid. Air or another fluid (e.g., another gas) may be flowed through the modular distribution assembly 200 to mix (e.g., bubble) with the fluid.

The modular distribution assembly 200 may include the top plate 220 and a bottom plate 230 coupled together by one or more support members 240 therebetween. In some embodiments, the bottom plate 230 may be substantially coextensive with a lower surface 150 of the assembly 100. An outer ring 250 or outer wall may circumferentially surround outer portions of the support members 240. The outer ring 250 may be disposed around a circumference of the top plate 220 and the bottom plate 230 and may extend longitudinally from the top plate 220 to the bottom plate 230. A volume 260 (e.g., plenum) defined by a space between the top plate 220, the bottom plate 230, and the outer ring 250 may house the purified or filtered fluid during operation. The fluid may exit the volume 260 of the modular distribution assembly 200 through the fluid outlet 120.

Support members 240 may be coupled to each of the top plate 220 and the bottom plate 230. The support members 240 may extend from a lower portion of the top plate 220 to an upper portion of the bottom plate 230. In some embodiments, the support members 240 may be configured to slidably couple to at least one of the top plate 220 or the bottom plate 230, as will be described further below.

When assembled, the modular distribution assembly 200 may be configured to be removably installed in a tank (e.g., the assembly 100). The modular distribution assembly 200 may include one or more threaded portions configured to attach a lifting ring to facilitate lifting the modular distribution assembly 200. The modular distribution assembly 200 may be configured outside of a tank. After the modular distribution assembly 200 is assembled, the modular distribution assembly 200 may be lifted and disposed in a tank having an inner diameter equal to approximately an outer diameter of the outer ring 250. By way of nonlimiting example, the inner diameter of the tank may be between about 1 cm and about 3 cm larger than the outer diameter of the outer ring 250. In some embodiments, the modular distribution assembly 200 may be disposed into a tank without welding the modular distribution assembly 200 to the tank. The modular distribution assembly 200 may operate as described above without welding the modular distribution assembly 200 to, for example, the inner wall of the tank.

Figure 2A:
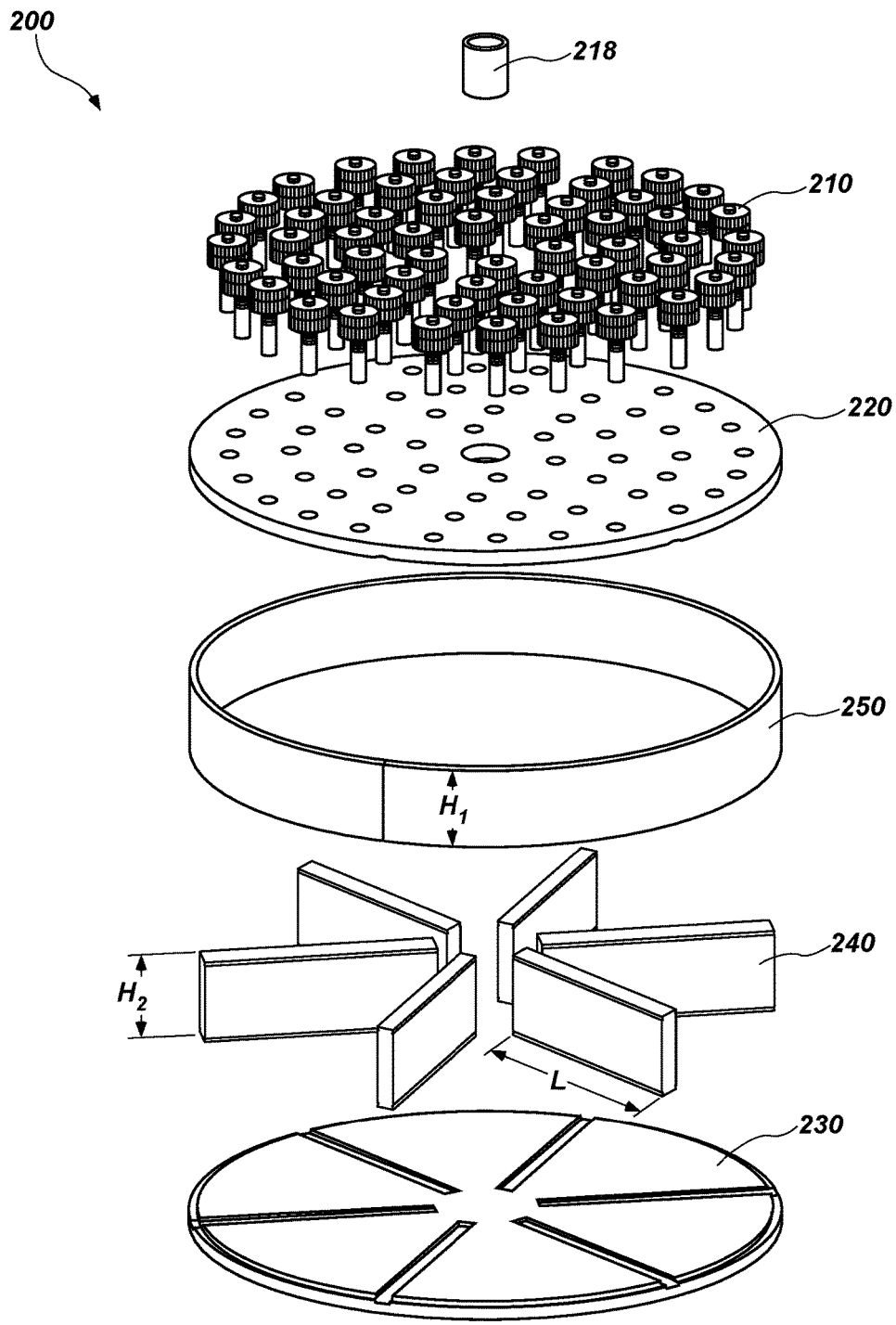
FIG. 2A is an exploded perspective view of the modular distribution assembly of FIG. 1.

FIG. 2A is an exploded perspective view of the modular distribution assembly 200 of FIG. 1, according to an embodiment of the disclosure. As illustrated, the outer ring 250 may be configured to extend circumferentially around the top plate 220 and the bottom plate 230. The outer ring 250 may have a height $H_1$, equal to about a height $H_2$, of the support members 240. When assembled, the top plate 220, the bottom plate 230, and the outer ring 250 may define the volume 260 (FIG. 1) within the modular distribution assembly 200. An outlet pipe 218 may be configured to couple with the fluid outlet 120 (FIG. 1) to direct filtrate from the modular distribution assembly 200 to the fluid outlet 120. In some embodiments, the height $H_1$ may range from about 0.64 cm (about 0.25 inch) to about 122 cm (about 48 inches), such as from about 0.64 cm (about 0.25 inch) to about 2.54 cm (about 1 inch), from about 2.54 cm (about 1 inch) to about 10.16 cm (about 4 inches), from about 10.16 cm (about 4 inches) to about 30.48 cm (about 12 inches), from about 30.48 cm (about 12 inches) to about 60.96 cm (about 24 inches), or from about 60.96 cm (about 24 inches) to about 122 cm (about 48 inches), although the disclosure is not so limited and other dimensions are contemplated. The height $H_1$ may at least partially depend on dimensions of the nozzles 210 or on the type of top plate 220 used in the modular distribution assembly 200.

The support members 240 may extend from the outer ring 250 to a location proximate a center of the modular distribution assembly 200. In some embodiments, the support members 240 may have a length L, equal to between about 30 percent and about 90 percent of a radius of the modular distribution assembly 200. In some embodiments, L may be equal to between about 70 percent and about 90 percent a value of the radius.

In some embodiments, the plurality of support members 240 may be substantially evenly spaced around a circumference of the modular distribution assembly 200. For example, each of the support members 240 may be spaced by about a same angle from adjacent support members 240. By way of nonlimiting example, where the modular distribution assembly 200 includes six support members 240, an angle between adjacent support members 240 may be equal to about 60°. In other embodiments, the support members 240 may be separated by about 90°, by about 45°, by about 30°, or by a different amount. The support members 240 may be positioned between the top plate 220 and the bottom plate 230 such that they do not interfere with locations of the nozzles 210.

Figure 2B:
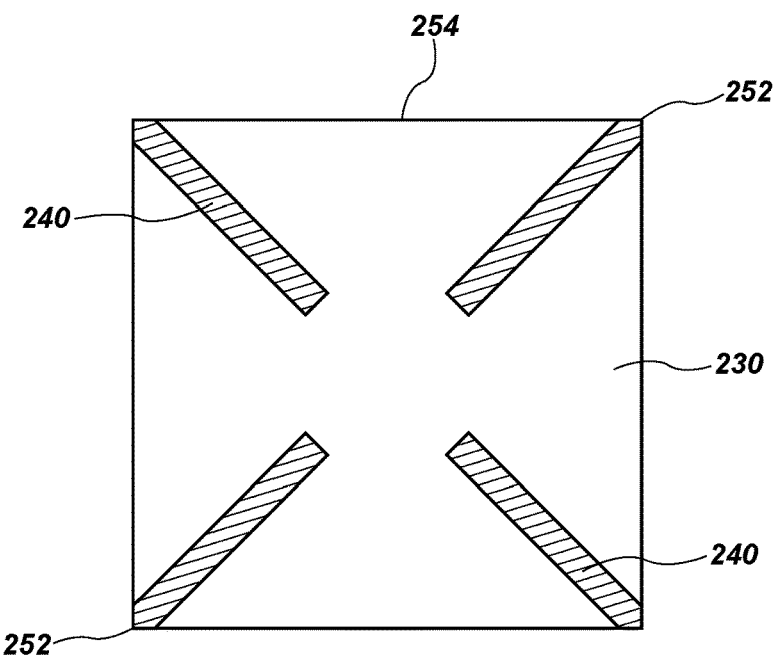
FIG. 2B is a planar view of a bottom plate and support members of the modular distribution assembly, in accordance with embodiments of the disclosure.
Figure 2C:
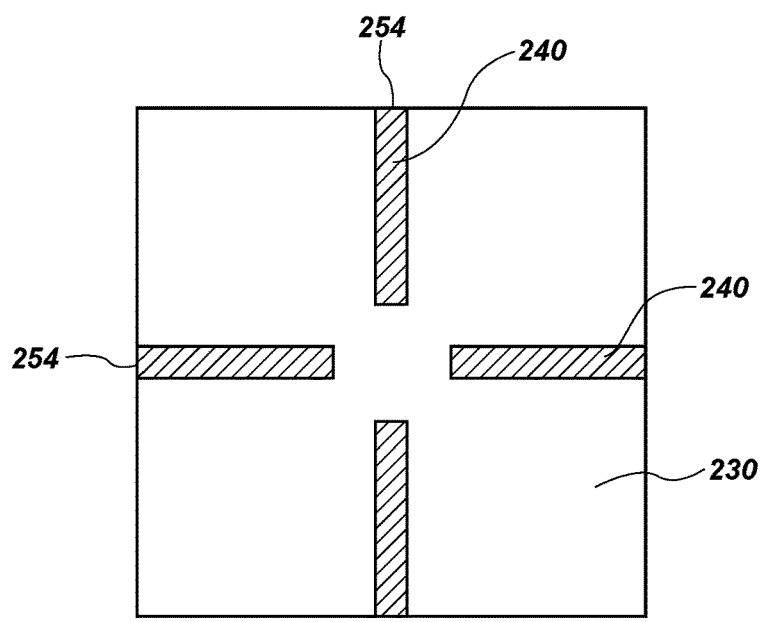
FIG. 2C is a planar view of a bottom plate and support members of the modular distribution assembly, in accordance with other embodiments of the disclosure.

In embodiments where the modular distribution assembly 200 comprises a square or rectangular cross-sectional shape, an angle between adjacent support members 240 may be equal to between about 45° and about 90°. FIG. 2B is a planar view showing a bottom plate 230 having a square cross-sectional shape with support members 240 thereon. The support members 240 may be disposed over the bottom plate 230 and may extend from corners 252 of the bottom plate 230. In some such embodiments, the support members 240 may be separated from adjacent support members 240 by an angle of about 90°. In other embodiments, the support members 240 may extend from a lateral or longitudinal central portion 254 of walls of the bottom plate 230, as illustrated in FIG. 2C. In other embodiments, an angle between adjacent support members 240 may be about 90°. In embodiments where a cross-sectional shape of the modular distribution assembly 200 (FIG. 2A) is polygonal, the support members 240 may extend from corners of the polygonal shape toward a center thereof, as illustrated in FIG. 2B. In other embodiments, the support members 240 may extend from central portions of walls of the polygonal shape, as illustrated in FIG. 2C. In yet other embodiments, the support members 240 may extend from both the corners 252 and from central portions 254 of walls of the bottom plate 230.

Figure 2D:
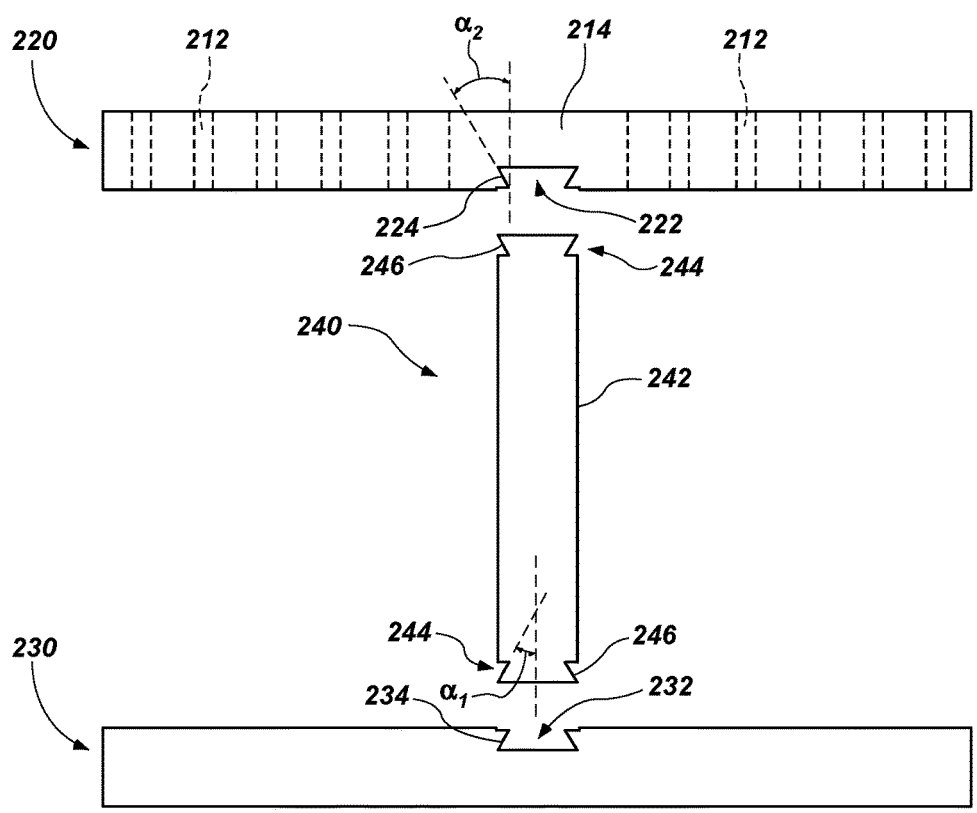
FIG. 2D is a longitudinal cross-sectional view of a support member of the modular distribution assembly, in accordance with embodiments of the disclosure.

Referring to FIG. 2D, an exploded cross-sectional view illustrating one of the support members 240 in relation to the top plate 220 and the bottom plate 230 is shown. Other support members 240 may be configured in a similar manner. The support member 240 may include substantially planar sidewalls 242. At least one end of the support member 240 may include a protrusion 244 configured to operably couple the support member 240 to one of the top plate 220 or the bottom plate 230. In some embodiments, the support member 240 may comprise protrusions 244 on each of opposing sides thereof such that the support member 240 may be configured to operably couple to both of the top plate 220 and the bottom plate 230. The protrusions 244 may each comprise angled sidewalls 246 (e.g., notches).

The top plate 220 may include a recess 222 (e.g., groove) defined at least partially by angled sidewalls 224. The recess 222 may be formed in a lower portion of the top plate 220. The recess 222 may be configured to slidably receive one of the protrusions 244 of the support member 240. The top plate 220 may further include through holes 212 configured for receiving a portion of the nozzles 210 (FIG. 2A). A central bore 214 may be configured to receive, for example, the outlet pipe 218 (FIG. 2A).

Similar to the top plate 220, the bottom plate 230 may include a recess 232 (e.g., groove) formed in an upper portion of the bottom plate 230. The recess 232 may be at least partially defined by angled sidewalls 234 that may substantially correspond to the angled sidewalls 246 of the protrusion 244. The recess 232 may be configured to operably couple with a corresponding protrusion 244 of the support member 240. In some embodiments, the protrusion 244 may be configured to be slidably received in the recess 232 of the bottom plate 230.

As shown in FIG. 2D, the recesses 222, 232 and the corresponding protrusions 244 of the support member 240 may form a dovetail joint. As an example, the corresponding angled sidewalls 246, 234 may be configured such that once the protrusion 244 is slidably coupled and engaged in the recess 232, the support member 240 may not be removed from the top plate 220 or the bottom plate 230 without sliding the support member 240 out from the recess 232. Stated another way, the support member 240 may lock in place responsive to a force perpendicular to a major surface of the top plate 220 or the bottom plate 230 (i.e., along a longitudinal axis of the support member 240). In some embodiments, the angles $\alpha_1$ of the angled sidewalls 246 with respect to a longitudinal axis of the support member 240 may be between about 5° and about 45°, such as between about 10° and about 30°, or between about 10° and about 20°. An angle $\alpha_2$ between a longitudinal axis of the top plate 220 or the bottom plate 230 and the angled sidewalls may substantially correspond to angle $\alpha_1$.

Advantageously, the top plate 220 and the bottom plate 230 may be slidably attached to the support member 240 without welding the support member 240 to either of the top plate 220 or the bottom plate 230, such as by welding the protrusion 244 to the sidewalls 224, 234 of the respective recesses 222, 232 of the top plate 220 and the bottom plate 230. Similarly, the top plate 220 and the bottom plate 230 may be coupled to the support members 240 without a threadable fastener (e.g., a screw). Accordingly, the support members 240 may be disposed between the top plate 220 and the bottom plate 230 without an adhesive and without welding or threadably attaching the support members 240 to the top plate 220 or the bottom plate 230.

Figure 2E:
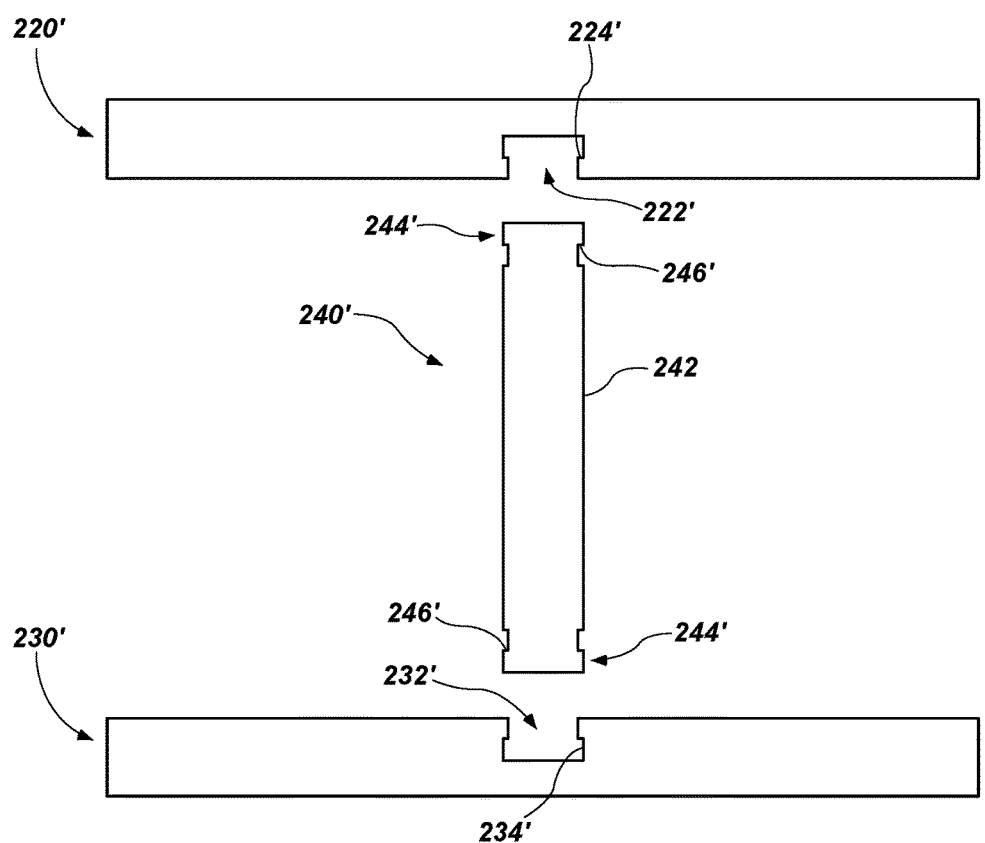
FIG. 2E is a longitudinal cross-sectional view of a support member of the modular distribution assembly, in accordance with other embodiments of the disclosure.

Although FIG. 2D illustrates a sliding dovetail joint for slidably connecting the support member 240 to the top plate 220 and the bottom plate 230, the disclosure is not so limited. FIG. 2E is a cross-sectional view of another support member 240' in relation to a top plate 220' and a bottom plate 230'. The support member 240' may include a T-shaped protrusion 244' (e.g., a T-slot) configured to slide in a recess 222' of the top plate 220'. The support member 240' may include at least another protrusion 244' configured to slide in a recess 232' of the bottom plate 230'. The recess 222' may include a retaining ledge 224' configured to retain a protruding ledge 246' of the protrusion 244'. Similarly, the recess 232' may include a retaining ledge 234' configured to retain the protruding ledge 246' of the protrusion 244' of configured to slide in the recess 232'.

Figure 2F:
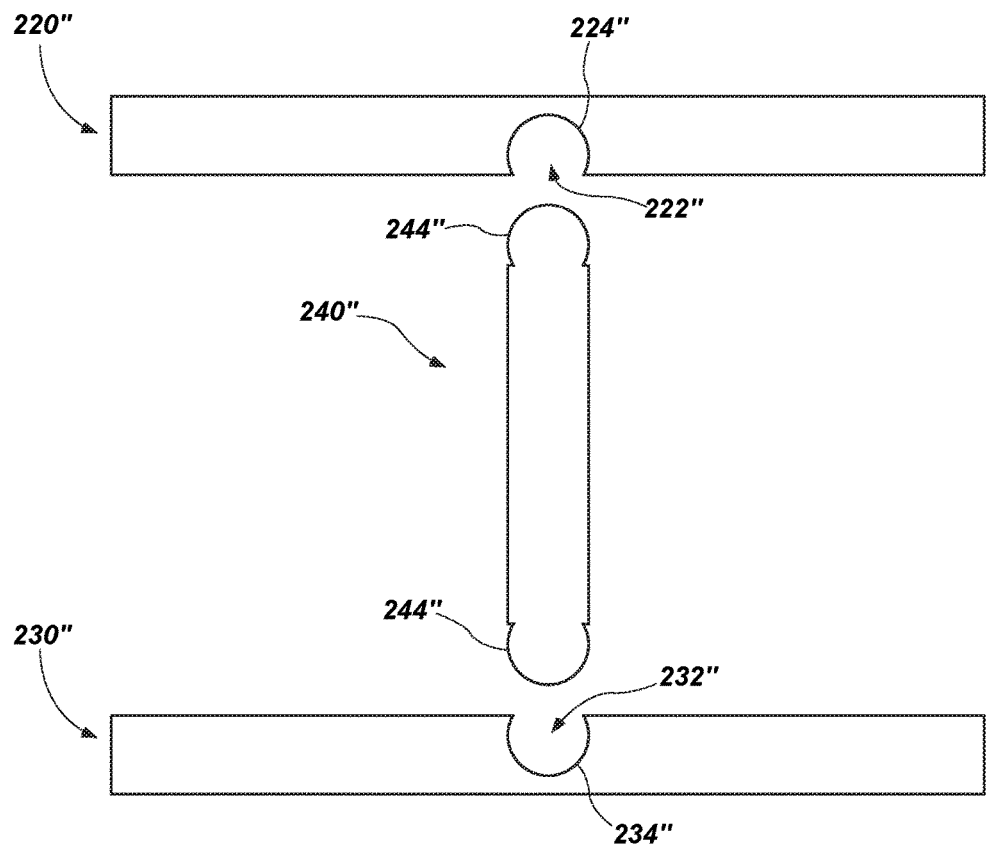
FIG. 2F is a longitudinal cross-sectional view of a support member of the modular distribution assembly, in accordance with yet other embodiments of the disclosure.

FIG. 2F is a cross-sectional view of another support member 240" in relation to a top plate 220" and a bottom plate 230". The support member 240" may include arcuate protrusions 244" on opposing ends thereof. The arcuate protrusions 244" may include curved surfaces and may be circular in shape, in some embodiments. The arcuate protrusions 244" may be configured to slide in a recess 222" in the top plate 220" and a recess 232" in the bottom plate 230". The recesses 222", 232" may include arcuate surfaces 224", 234" corresponding to the arcuate protrusions 244" of the support member 240". The support member 240" may be configured to slidably couple to each of the top plate 220" and the bottom plate 230" by sliding the arcuate protrusions 244" into each of the recesses 222", 232".

It is contemplated that the protrusion 244 of the support member 240 and the recesses 222, 232 of the top plate 220 and the bottom plate 230, respectively comprise other shapes and configurations suitable for slidably coupling the support member 240 to the top plate 220 and the bottom plate 230.

Although the support member 240 has been described as comprising a protrusion 244, the disclosure is not so limited. In other embodiments, the support member 240 may comprise a recess configured to be engaged by a corresponding protrusion of each of the top plate 220 and the bottom plate 230 such that the top plate 220 and the bottom plate 230 may be slidably coupled to the support member 240.

Figure 2G:
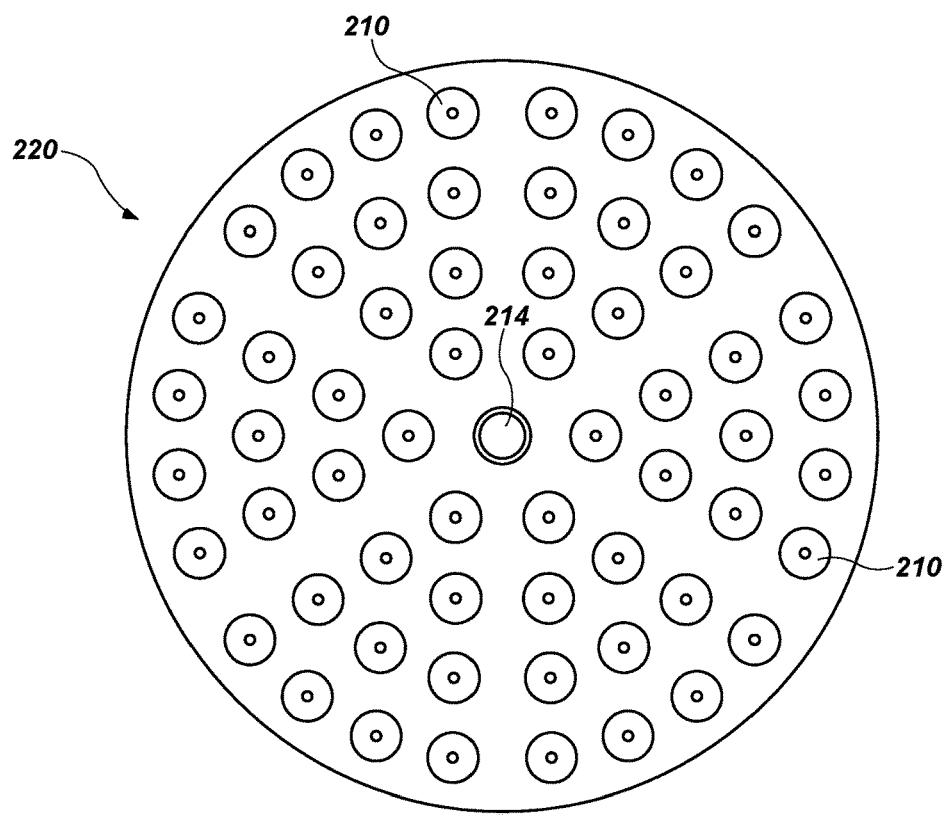
FIG. 2G is a plan view of the top plate of the modular distribution assembly, in accordance with embodiments of the disclosure.

FIG. 2G is a plan view of the top plate 220 showing the nozzles 210 and the central bore 214 configured to receive the outlet pipe 218 (FIG. 2A). In some embodiments, the top plate 220 includes a plurality of nozzles 210 arranged in a pattern of nozzles 210 on the top plate 220. In some embodiments, the nozzles 210 may be located at different distances from an outer circumference of the top plate 220. Although FIG. 2G illustrates sixty (60) nozzles 210 arranged in a particular pattern, the disclosure is not so limited and the top plate 220 may include any number of nozzles 210 arranged in any pattern.

Figure 2H:
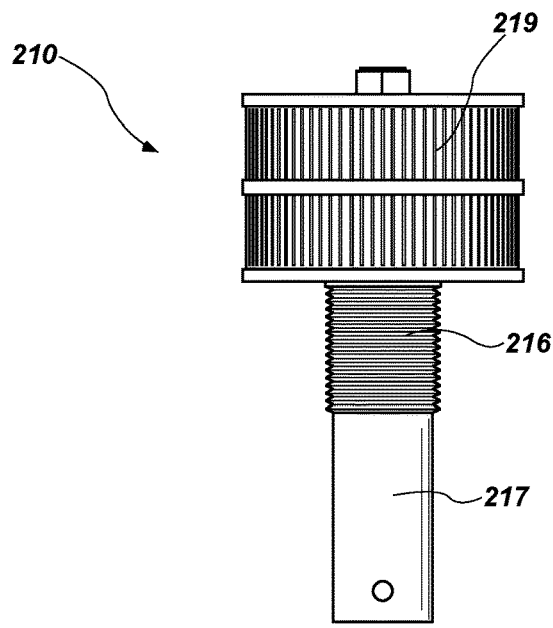
FIG. 2H is a cross-sectional view of a nozzle, in accordance with embodiments of the disclosure.

FIG. 2H is a cross-sectional view of a nozzle 210. The nozzle 210 may include a threaded portion 216 configured to threadably attach the nozzle 210 to the top plate 220. The nozzle 210 may include a bolt portion 217 configured to pass through the through holes 212 (FIG. 2G) of the top plate 220 (FIG. 2G). A top portion of the nozzle 210 may include a plurality of slots 219 configured to allow passage of fluid therethrough while preventing portions of the gravel bed 102 (FIG. 1) or the media bed 104 (FIG. 1), such as sand or anthracite, from passing therethrough. In other words, spacing between adjacent slots 219 may be less than a size of the media of the media bed 104 or the gravel bed 102. In some embodiments, adjacent slots 219 are spaced by about 0.3 mm, although the disclosure is not so limited.

The modular distribution assembly 200 may have a generally circular cross-sectional shape, similar to the assembly 100. In some embodiments, the assembly 100 and, therefore, the modular distribution assembly 200 may have an outside diameter equal to slightly less than an inside diameter of the assembly 100 such that the modular distribution assembly 200 may fit within the assembly 100. In some embodiments, a clearance between the modular distribution assembly 200 and an inside wall of the assembly 100 is equal to about 1 cm. In some embodiments, the modular distribution assembly 200 has an outside diameter from about 5.08 cm (about 2 inches) to about 4.88 meters (about 16 feet), as described above with reference to the assembly 100 (FIG. 1). In some embodiments, the modular distribution assembly 200 has an outside diameter of about 122 cm and is configured to fit inside an assembly 100 having an internal diameter of about 122 cm.

The slidable attachment mechanisms described herein facilitate attachment of the support members 240 to the top plate 220 and the bottom plate 230 without a weld and without threadably attaching the support members 240 to the top plate 220 or the bottom plate 230. The protrusions 244 and corresponding recesses 222, 232 of the respective top plate 220 and bottom plate 230 facilitate a substantially strong attachment of the support members 240 to the top plate 220 and the bottom plate 230. With the slidable attachment described herein, the modular distribution assembly 200 may withstand differential pressures (e.g., uplift pressures) up to at least about 138 kPa (about 20 psi), up to at least about 207 kPa (about 30 psi), up to at least about 276 kPa (about 40 psi), or even up to at least about 310 kPa (about 45 psi) without failing (e.g., what is referred to in the art as "blow out").

In some embodiments, one or more structures of the assembly 100 may be formed from a plastic material or a metal material. In some embodiments, one or more of the nozzles 210, the top plate 220, the bottom plate 230, the support members 240, the outer ring 250, the media retention member 370 (FIG. 3A), or the housing of the assembly 100 may comprise a plastic material. The plastic material may comprise one or more of polyvinyl chloride (PVC), chlorinated polyvinyl chloride (CPVC), high density polyethylene (HDPE), low density polyethylene (LDPE), polypropylene (PP), polystyrene (PS), polyethylene terephthalate (PETE), or other thermoplastic or thermosetting plastic materials. Such plastic materials may be lighter, corrosion resistant, and less expensive than metals. Advantageously, the slidable attachment as described herein may facilitate use of plastic materials able to withstand a substantial pressure drop.

The modular distribution assembly 200 described herein may be particularly useful for use in assemblies having a relatively short distance between the top plate 220 and the bottom plate 230 (e.g., the height, $H_2$ (FIG. 2A)). For example, at shorter distances between the top plate 220 and the bottom plate 230, it is difficult for a technician to form a suitable weld between components of an assembly. The modular distribution assemblies 200 described herein may be formed without having to weld components thereof (e.g., the support members 240 to the top plate 220 or the bottom plate 230) because of the slidable retention means. Accordingly, the modular distribution assemblies 200 may have smaller dimensions than those previously possible.

The modular distribution assembly 200 described herein may be configured to be installed in an existing tank to form an assembly similar to the assembly 100 described above with reference to FIG. 1. In some embodiments, a tank (e.g., vessel) may be retrofitted by inserting the modular distribution assembly 200 to form the assembly 100.

A method of forming the modular distribution assembly 200 may include slidably attaching one or more of the support members 240 (FIG. 2A) the bottom plate 230 and the top plate 220. The top plate 220, 220', 220" and the bottom plate 230, 230', 230" may be provided with one of the recesses 222, 222', 222", 232, 232', 232", respectively, as described above with reference to FIG. 2D through FIG. 2F. The support members 240, 240', 240" may be provided with the protrusions 244, 244', 244", as described above. Each of the support members 240, 240', 240" may be slidably coupled to the top plate 220, 220', 220" and the bottom plate 230, 230', 230" to operably couple the top plate 220, 220', 220" to the bottom plate 230, 230', 230". In other embodiments, the top plate 220, 220', 220" and the bottom plate 230, 230', 230" may be provided with protrusions and the support members 240, 240', 240" may be provided with recesses configured to receive the protrusions.

The outer ring 250 may be disposed around the top plate 220 and the bottom plate 230 which are operably coupled together by the support members 240. The outer ring 250 may also be disposed around the media retention member 370 (see FIG. 3A), if included. In some embodiments, the outer ring 250 may be welded to portions of the bottom plate 230 and the top plate 220, or the media retention member 370 if included. Gasket material (not shown) may be disposed between the media retention member 370 and the top plate 220.

In some embodiments, the nozzles 210 may be threadably attached to the top plate 220 prior to disposing the modular distribution assembly 200 in the tank. In other embodiments, the nozzles 210 may be threadably attached to the top plate 220 after disposing the modular distribution assembly 200 in the tank. Of course, it is contemplated, that in other embodiments, the top plate 220 comprises a perforated disc, a screen, or other structure, as described above with reference to FIG. 2A.

To form the assembly 100, the modular distribution assembly 200, including the bottom plate 230, the support members 240, the top plate 220, the media retention member 370 (if included), and the outer ring 250, may be inserted into the tank. Although not illustrated, the top plate 220 may include one or more threaded portions to receive, for example, lifting rings (e.g., eye bolts) to facilitate lifting and disposing the modular distribution assembly 200 into the tank. It is contemplated that in some embodiments, after disposing the modular distribution assembly 200 in the tank, an outer portion of the outer ring 250 may be welded to an internal wall of the tank to facilitate forming a fluid seal between the modular distribution assembly 200 and the internal wall of the tank, although the disclosure is not so limited. In some such embodiments, the fluid outlet 120 (FIG. 1) may be located below the modular distribution assembly 200.

As discussed above, the assembled modular distribution assembly 200 may be lifted and disposed into the tank. In some embodiments, the modular distribution assembly 200 is not welded to the tank. In some such embodiments, the tank, including the modular distribution assembly 200 may operate as a filter, a fluidized bed reactor, a dewatering vessel, a mixer, or other vessel without welding the modular distribution assembly 200 to the tank. Advantageously, the modular distribution assembly 200 can be formed outside of the tank, facilitating easier fabrication of the modular distribution assembly by a technician.

Forming the modular distribution assembly 200 with the slidably attachment between the support members 240 and each of the top plate 220 and the bottom plate 230 may facilitate forming the modular distribution assembly to heights ($H_1$ (FIG. 2A)) of any desired amount. In some embodiments, the modular distribution assembly 200 may be formed to a height less than heights of conventional distribution assemblies. In some embodiments, a height of the modular distribution assembly 200 may be less than about 2 cm, less than about 1 cm, or less than about 0.5 cm.

In some embodiments, the modular distribution assembly 200 may not include any welds other than a weld between the outer ring 250 and the top plate 220 and between the bottom plate 230 and the outer ring 250. Compared to prior art distribution assemblies, the modular distribution assemblies 200 described herein can withstand a sufficiently greater differential pressure (between an inside of the modular distribution assembly 200 and an outside of the modular distribution assembly 200) without failing. By way of example only, prior art distribution assemblies may fail responsive to exposure to between about 41.4 kPa (about 6 psi) and about 55.2 kPa (about 8 psi). By way of contrast, the modular distribution assemblies 200 described herein may withstand differential pressures up to at least about 310 kPa (about 45 psi) without failing.

In some embodiments, where the modular distribution assembly 200 is exposed to a differential pressure substantial to blow out the modular distribution assembly 200, the modular distribution assembly 200 may be configured to fail at a joint between the outer ring 250 and the top plate 220 and the outer ring 250 and the bottom plate 230. In some such embodiments, a failed modular distribution assembly 200 may be replaced by removing the outer ring 250 from the top plate 220 and the bottom plate 230 and replacing an old outer ring 250 with a new outer ring 250. The new outer ring 250 may be welded to the top plate 220 and the bottom plate 230 and the repaired modular distribution assembly 200 may be disposed in the tank.

The assemblies 100 described herein may be useful for a number of filtering or purification processes. By way of nonlimiting example, the assembly 100 may be used for dewatering, water purification, water filtration, or other processes for purifying a liquid, filtering a liquid, or both.

Although the assemblies 100 described herein have been described as water filters, the disclosure is not so limited. In other embodiments, the modular distribution assembly 200 may be used in a fluidized bed reactor. In some such embodiments, the gravel bed 102 (FIG. 1) and the media bed 104 (FIG. 1) would be replaced with media for a fluidized bed. In some such embodiments, the assembly 100 may be configured as a fluidized bed reactor. Accordingly, a fluidized bed reactor may be formed from a tank by inserting the modular distribution assembly 200 in the tank and disposing fluidized bed media over the modular distribution assembly 200.

Although the modular distribution assembly 200 and the top plate 220 have been described as including nozzles 210, the disclosure is not so limited. In other embodiments, the top plate 220 may comprise a perforated disc or sheet comprising a plurality of openings therein. In some such embodiments, the top plate 220 comprises a plurality of orifices in a desired pattern to substantially uniformly distribute the fluid downwards or upwards through the top plate 220. In other embodiments, the top plate 220 may comprise a screen configured to substantially prevent particles larger than a predetermined size from passing therethrough.

FIG. 2I is a perspective view of the modular distribution assembly 200 with the different elements described herein being interconnected (i.e., without being an exploded view as in FIG. 2A). As shown, the outer ring 250 may substantially surround a circumference of the modular distribution assembly 200, which may further include the top plate 220 and the bottom plate 230. The support member 240 may be disposed within the modular distribution assembly 200 and between the top plate 220 and the bottom plate 230, as described above.

Figure 3A:
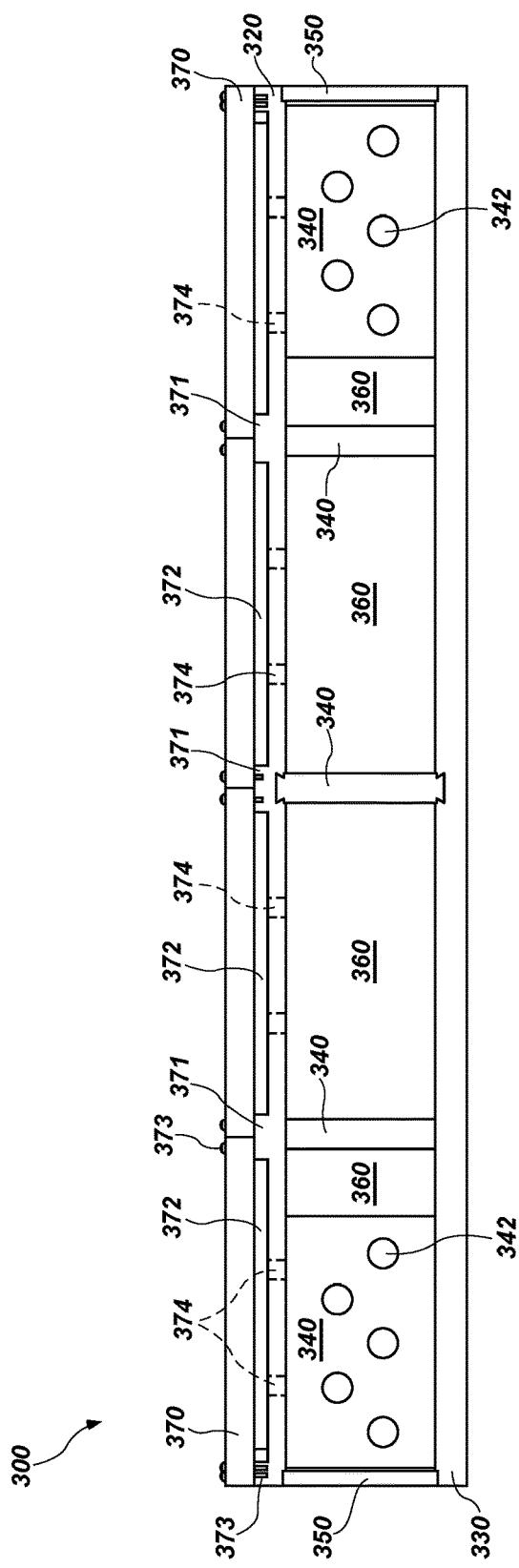
FIG. 3A is a cross-sectional view of a modular distribution assembly, in accordance with embodiments of the disclosure.
Figure 3B:
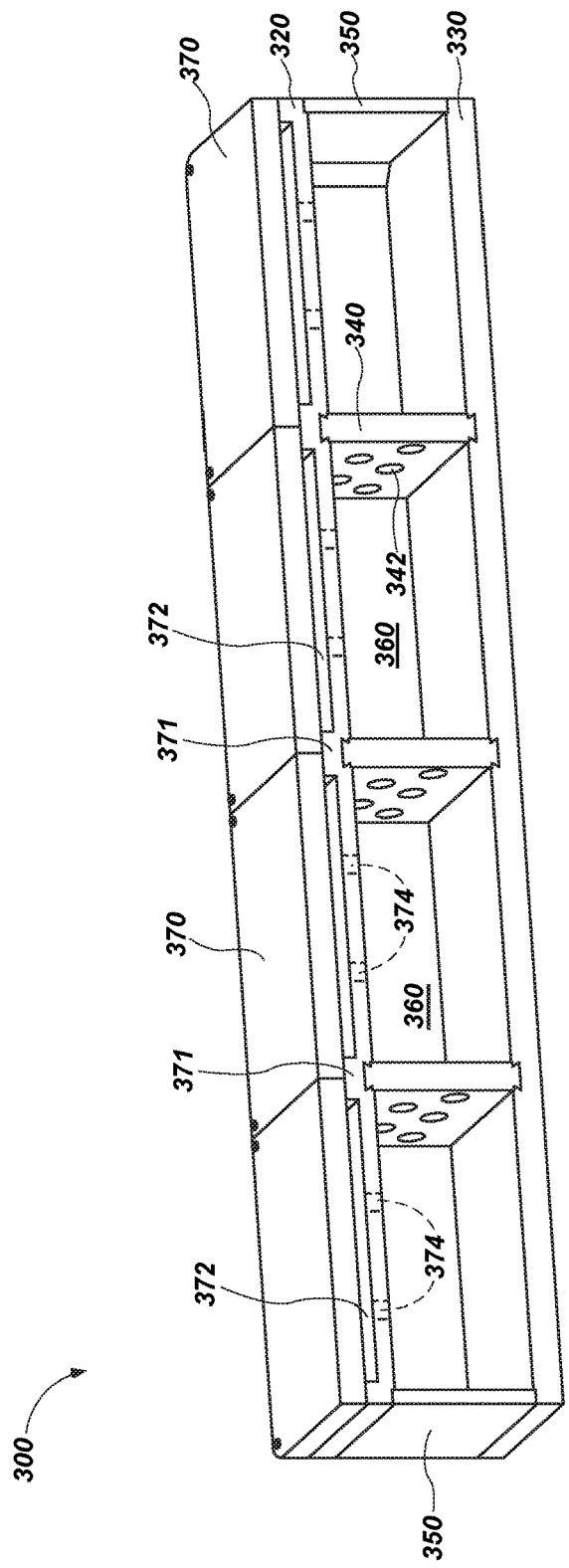
FIG. 3B is a cut-away perspective view of a modular distribution assembly, in accordance with embodiments of the disclosure.

FIG. 3A and FIG. 3B are a cross-sectional view and a cut-away perspective view, respectively, of a modular distribution assembly 300 including a media retention member 370 overlying a top plate 320, according an embodiment of the disclosure. The modular distribution assembly 300 may be square or rectangular in shape, although the disclosure is not so limited and the modular distribution assembly 300 may exhibit other shapes. The modular distribution assembly 300 may include support members 340 disposed between the top plate 320 and a bottom plate 330. In some embodiments, at least some of the support members 340 may be oriented at an angle (e.g., substantially perpendicular) with respect to at least other support members 340. The support members 340 may include holes 342 configured to facilitate passage of fluid therethrough.

The media retention member 370 may comprise a porous plate, a metal screen (e.g., a wedge wire screen), a fabric, or a plate comprising a plurality of orifices. In some embodiments, the media retention member 370 comprises a porous plate comprising a ceramic material. In other embodiments, the media retention member 370 comprises a fabric material comprising, for example, a polypropylene material. The fabric material may be clamped to the top plate with, for example, hose clamps, as may be understood by one of skill in the art.

The media retention member 370 may be secured to the top plate 320 with one or more fastening members 373, which may comprise, for example, screws. The top plate 320 may include protruding portions 371 that are configured to receive the fastening members 373. The protruding portions 371 may contact a lower surface of the media retention member 370. The top plate 320 may further include recessed portions 372 that define cavities between the media retention member 370 and the top plate 320. The cavities may be configured to store liquid, which may pass through the top plate 320 via through holes 374 in the top plate 320 to a volume 360 defined by the top plate 320 and a bottom plate 330. An outer wall 350 may be disposed around a perimeter of the modular distribution assembly 300.

In some embodiments, a gasket material may be disposed between the media retention member 370 and the top plate 320 to facilitate a fluid seal therebetween.

Figure 3C:
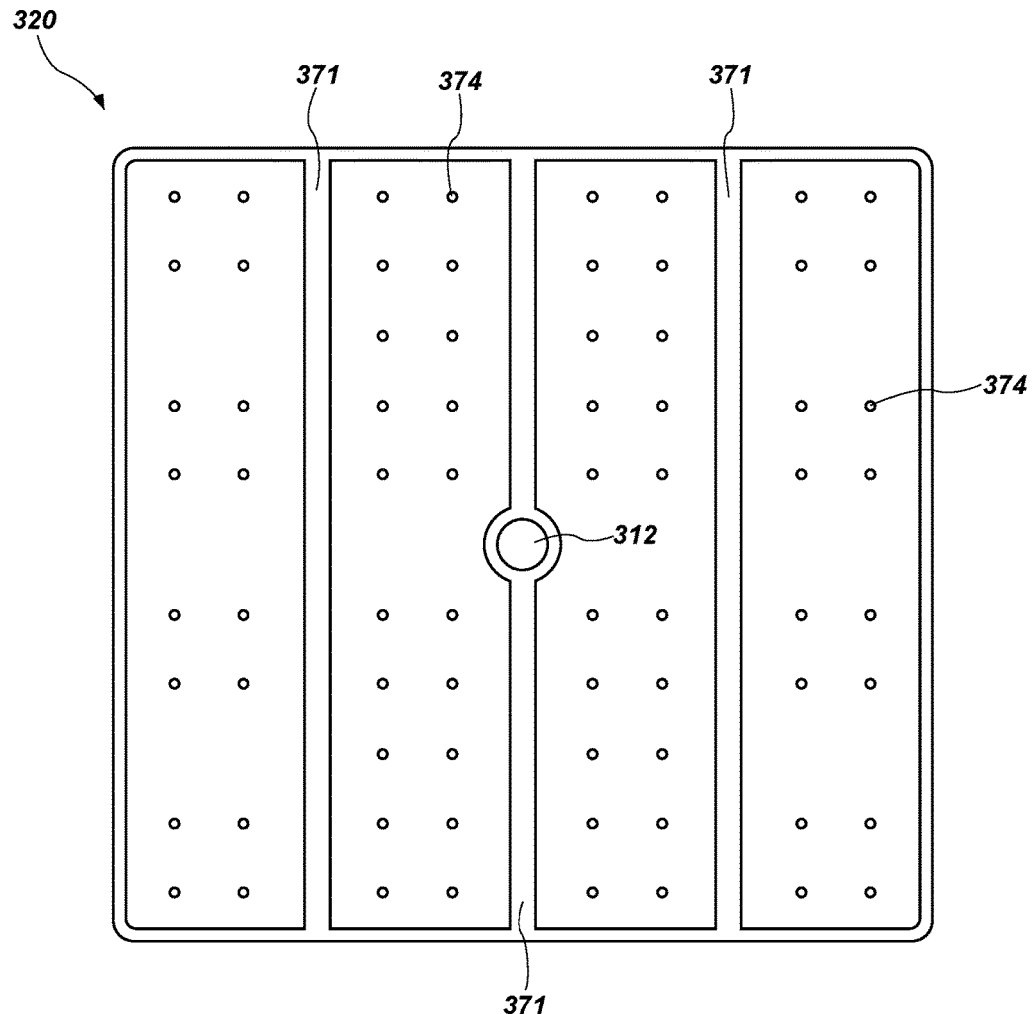
FIG. 3C is a top view of a top plate, in accordance with embodiments of the disclosure.

FIG. 3C is a top view of the top plate 320. As described above, the top plate 320 may include a plurality of through holes for passage of fluid through the top plate 320 and to the volume 360 (FIG. 3A, FIG. 3B). The top plate 320 may include an opening 312 for receiving the fluid outlet 120 (FIG. 1).

Figure 3D:
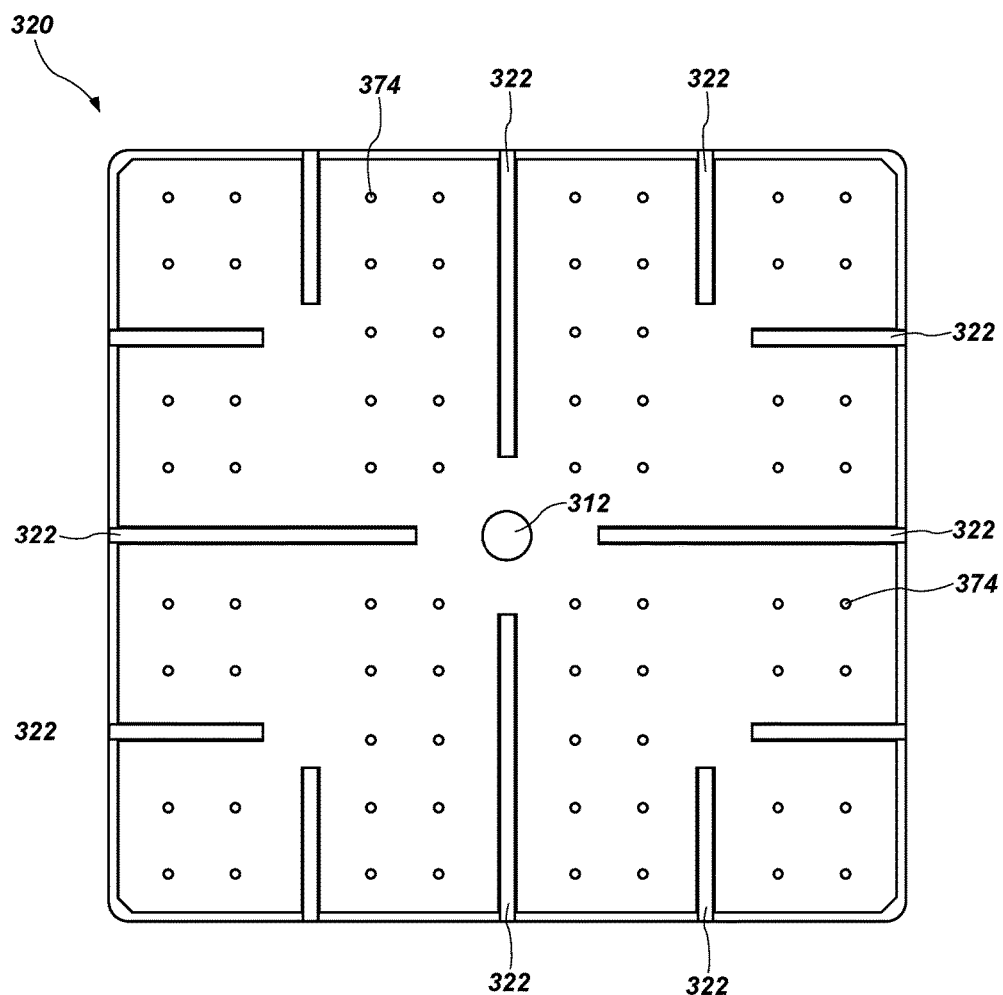
FIG. 3D is a bottom view of the top plate of FIG. 3C.
Figure 3E:
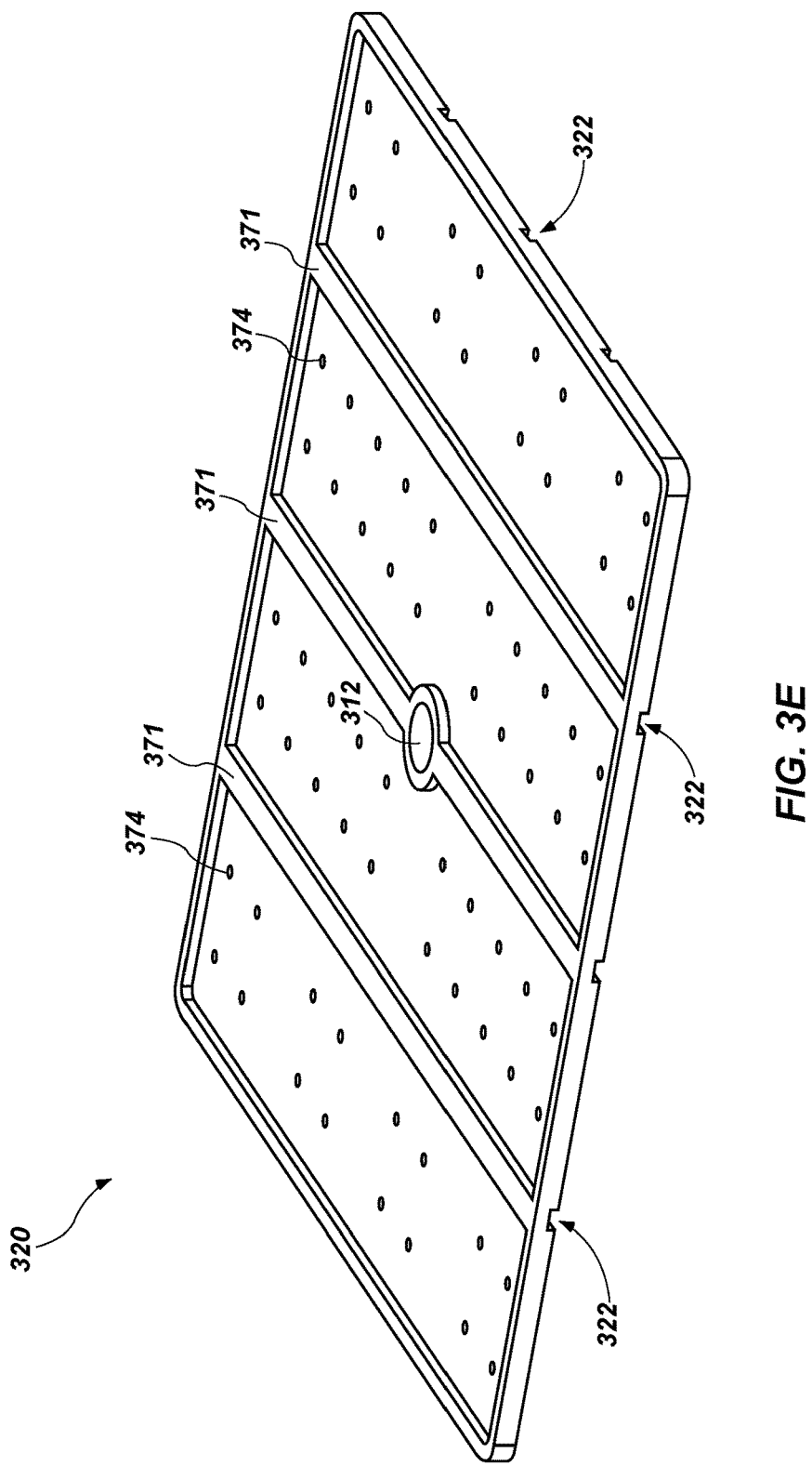
FIG. 3E is a perspective view of the top plate of FIG. 3C.

FIG. 3D and FIG. 3E are a bottom view and a perspective view, respectively, of the top plate 320. The bottom of the top plate 320 may include a plurality of recesses 322 configured to receive a corresponding protrusion of the support members 340, as described above with reference to FIG. 2D through FIG. 2F.

Figure 3F:
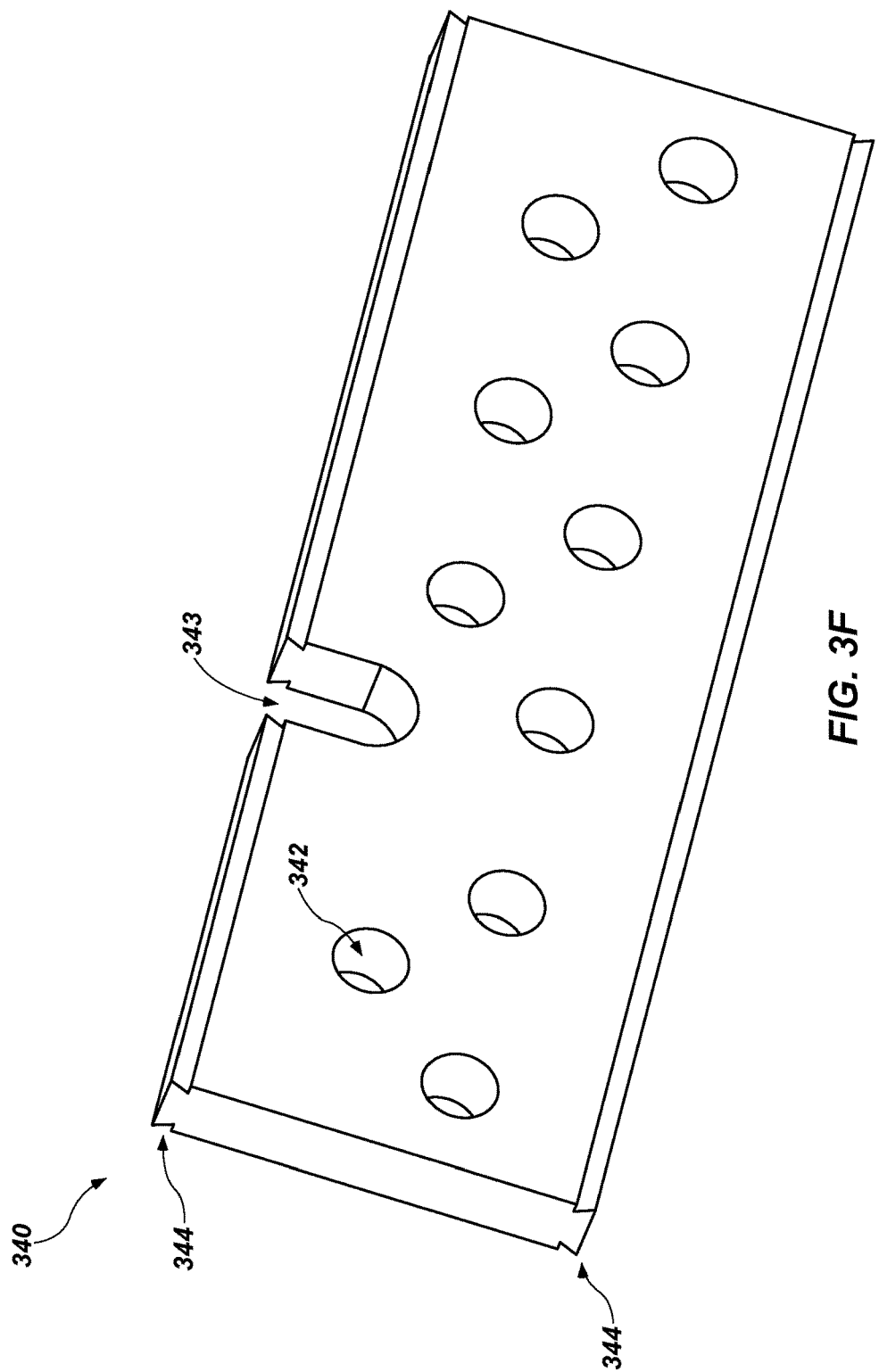
FIG. 3F and FIG. 3G are perspective views of different support members, in accordance with embodiments of the disclosure.
Figure 3G:
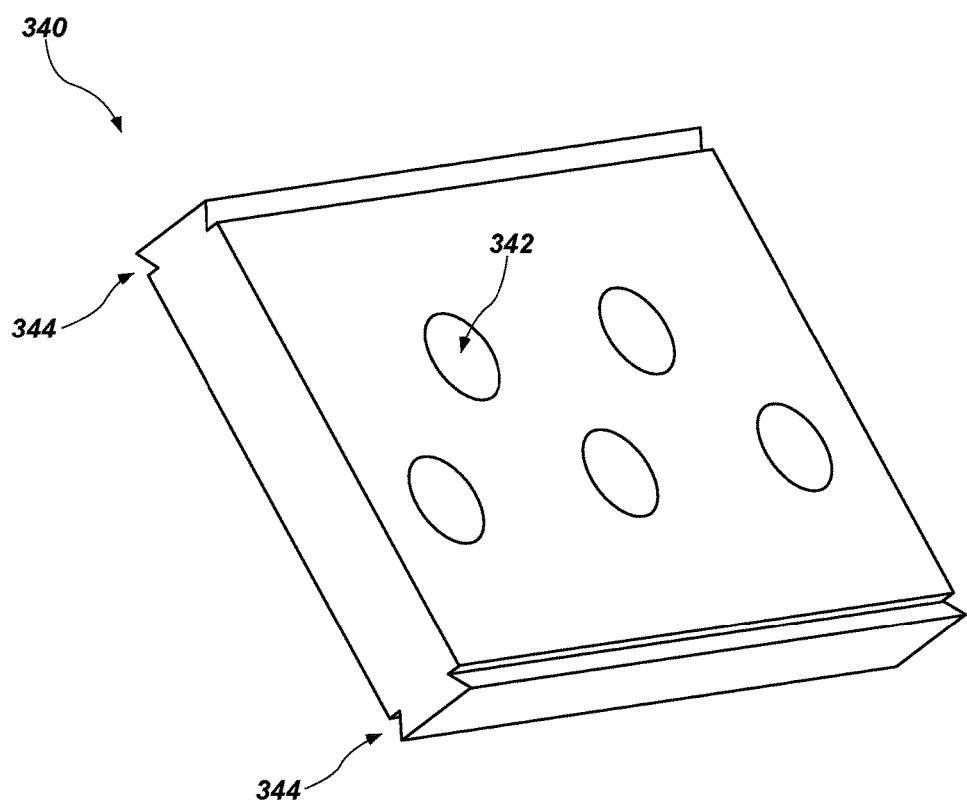

FIG. 3F and FIG. 3G are perspective views of different support members 340. The support member 340 may include protrusions 344, as described above with reference to FIG. 2D through FIG. 2F. In some embodiments, at least some of the support members 340 may include a recessed portion 343 (FIG. 3F), which may be configured to provide clearance for a lifting ring that may be used for lifting and disposing the modular distribution assembly 300 into a tank or other vessel.

Figure 3H:
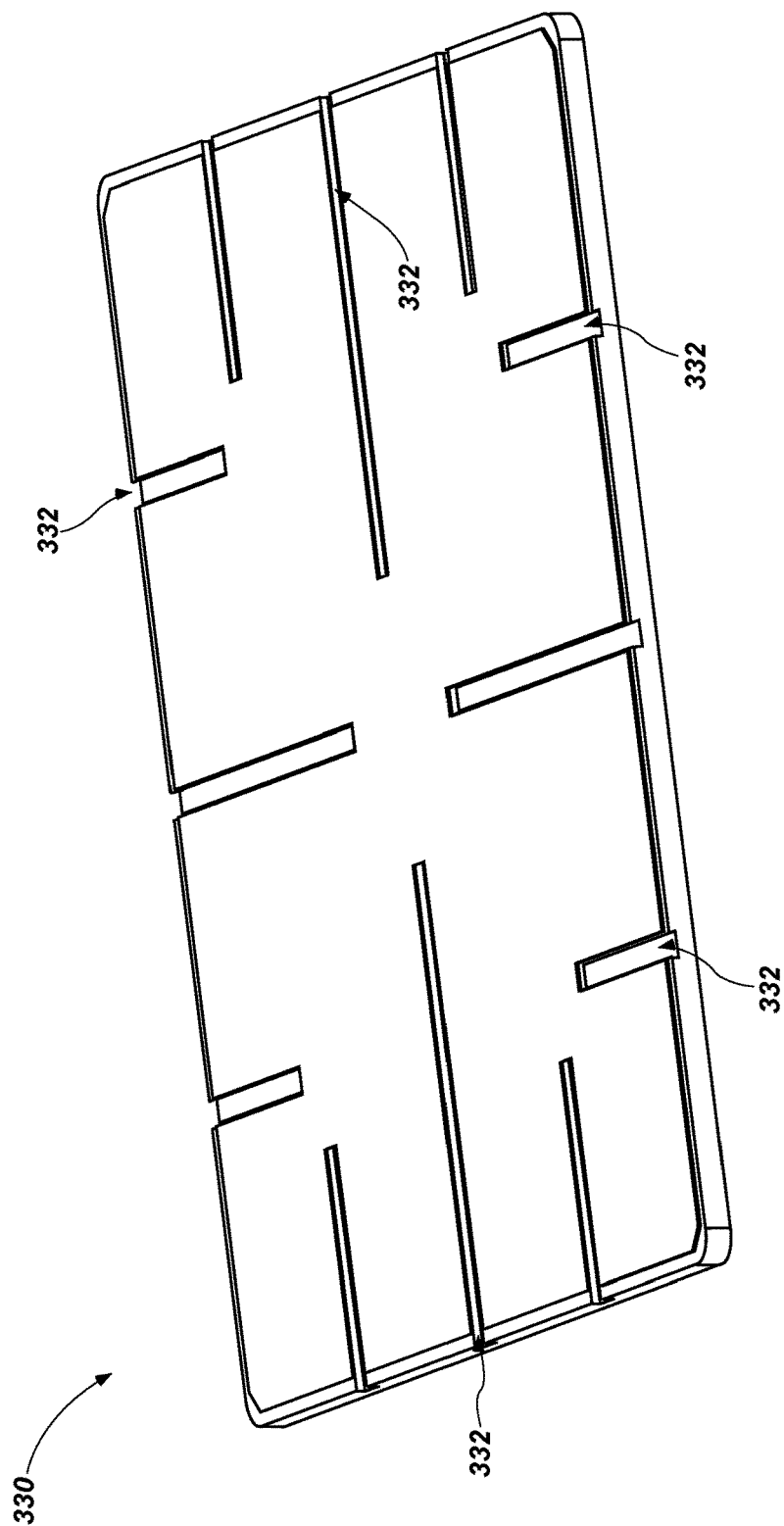
FIG. 3H is a perspective view of a bottom plate, in accordance with embodiments of the disclosure.

FIG. 3H is a perspective view of the bottom plate 330. The bottom plate 330 may include a plurality of recesses 332 configured to receive the protrusions 344 (FIG. 3F, FIG. 3G) of the support member 340. Although the protrusions 344 are illustrated as comprising a dovetail, the disclosure is not so limited and the protrusions 344 may comprise a T-slot protrusion or an arcuate protrusion, as described above with reference to FIG. 2E and FIG. 2F, respectively.

Figure 3I:
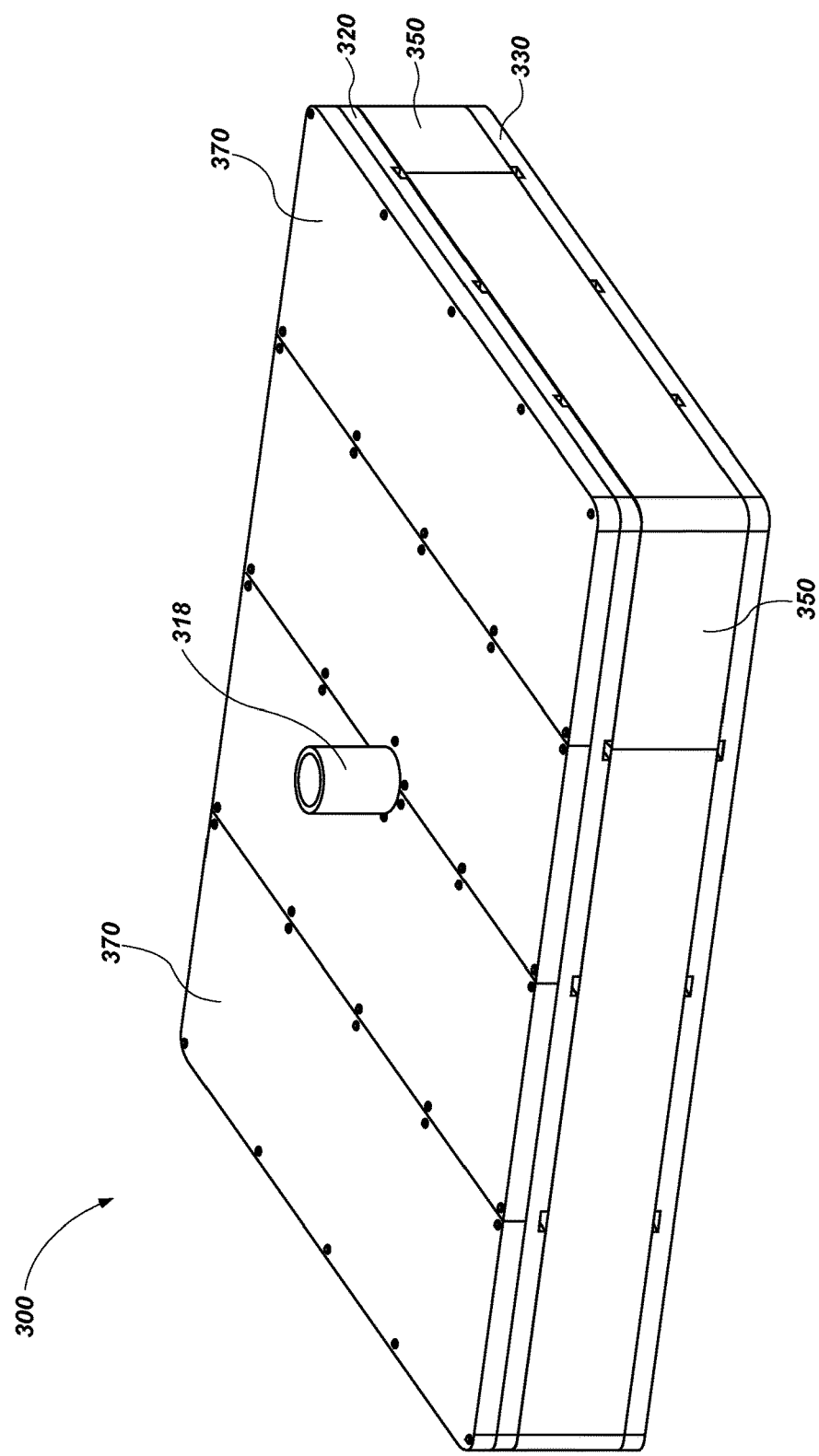
FIG. 3I is a perspective view of a modular distribution assembly, in accordance with embodiments of the disclosure.

FIG. 3I is a perspective view of the modular distribution assembly 300 shown in an assembled configuration. The modular distribution assembly 300 may include an outlet pipe 318 configured to couple with the fluid outlet 120 (FIG. 1). The modular distribution assembly 300 may include one or more threaded portions to receive, for example, lifting rings (e.g., eye bolts) to facilitate lifting and disposing the modular distribution assembly 300 into a tank or other vessel.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A modular distribution assembly, comprising:
   a top plate;
   a plurality of nozzles coupled to the top plate;
   a bottom plate, each of the top plate and the bottom plate comprising a plurality of recesses;
   a plurality of support members slidably coupled to each of the top plate and the bottom plate, each support member of the plurality of support members comprising a first protrusion on a first side thereof and a second protrusion on a second, opposite side thereof, the first protrusion configured to slidably couple to a corresponding recess of the top plate and the second protrusion configured to slidably couple to a corresponding recess of the bottom plate; and
   a fluid outlet configured to facilitate removal of fluid from a volume between the top plate and the bottom plate.

2. The modular distribution assembly of claim 1, wherein each recess of the plurality of recesses and the protrusions comprise a dovetail joint.

3. The modular distribution assembly of claim 1, wherein each recess of the plurality of recesses and the protrusions comprise a T-slot joint.

4. The modular distribution assembly of claim 1, wherein the plurality of support members each comprise a plastic material.

5. The modular distribution assembly of claim 1, wherein each of the top plate, the bottom plate, and the plurality of support members comprise a plastic material.

6. The modular distribution assembly of claim 1, further comprising an outer ring extending from the top plate to the bottom plate.

7. The modular distribution assembly of claim 1, wherein the modular distribution assembly is configured to withstand a differential pressure between an inside of the modular distribution assembly and an outside of the modular distribution assembly of at least about 310 kPa.

8. The modular distribution assembly of claim 1, wherein each support member of the plurality of support members is coupled to the top plate and the bottom plate without a weld therebetween.

9. The modular distribution assembly of claim 1, wherein the top plate and the bottom plate comprise one of a circular cross-sectional shape, a square cross-sectional shape, or a rectangular cross-sectional shape.

10. The modular distribution assembly of claim 1, wherein each support member of the plurality of support members is separated from an adjacent support member by about a same angle.

11. The modular distribution assembly of claim 1, wherein each support member of the plurality of support members extends to a peripheral portion of the top plate or the bottom plate.

12. An assembly, comprising:
a tank housing a modular distribution assembly, the modular distribution assembly comprising:
a top plate;
a plurality of nozzles coupled to the top plate;
a bottom plate, each of the top plate and the bottom plate comprising a plurality of recesses;
a plurality of support members slidably coupled to each of the top plate and the bottom plate, each support member of the plurality of support members comprising a first protrusion on a first side thereof and a second protrusion on a second, opposite side thereof, the first protrusion configured to slidably couple to a corresponding recess of the top plate and the second protrusion configured to slidably couple to a corresponding recess of the bottom plate; and
a fluid outlet configured to facilitate removal of fluid from a volume between the top plate and the bottom plate.

13. A method of forming an assembly, the method comprising:
forming a modular distribution assembly by:
slidably attaching a plurality of support members to a bottom plate and to a top plate, each of the top plate and the bottom plate comprising a plurality of recesses, wherein each of the support members of the plurality of support members comprises a first protrusion on a first side thereof and a second protrusion on a second, opposite side thereof, wherein the first protrusion is slidably coupled to a corresponding recess of the top plate and the second protrusion is slidably coupled to a corresponding recess of the bottom plate, wherein the modular distribution assembly comprises a plurality of nozzles coupled to the top plate and a fluid outlet configured to facilitate removal of fluid from a volume between the top plate and the bottom plate;
disposing an outer ring around the bottom plate and the top plate, the outer ring extending from the bottom plate to the top plate; and
welding the outer ring to the top plate and to the bottom plate.

14. The method of claim 13, wherein slidably attaching a plurality of support members to a bottom plate and a top plate comprises slidably attaching each support member of the plurality of support members to the bottom plate and the top plate with one of a dovetail joint or a T-slot joint.

15. The method of claim 13, further comprising disposing the modular distribution assembly inside a tank.

16. The method of claim 15, wherein disposing the modular distribution assembly inside the tank includes disposing the modular distribution assembly into the tank after the tank has been formed.

17. The method of claim 13, wherein each support member is separated from adjacent support members by about a same angle.

* * * * *